United States Patent Office 2,895,953
Patented July 21, 1959

2,895,953

PROCESS FOR PURIFICATION OF PARTIALLY HYDROLYZED STEROIDAL SAPONINS

Monroe E. Wall, Oreland, and Harold E. Kenney, Hatboro, Pa., assignors to the United States of America as represented by the Secretary of Agriculture No Drawing. Application December 18, 1957
Serial No. 703,712

1 Claim. (Cl. 260—210.5)

(Granted under Title 35, U.S. Code (1952), sec. 266)

A non-exclusive, irrevocable, royalty-free license in the invention herein described, throughout the world for all purposes of the United States Government, with the power to grant sublicenses for such purposes, is hereby granted to the Government of the United States of America.

This invention relates to purification of partially hydrolyzed water insoluble steroidal saponins. Steroidal saponins are the precursors in plants of steroidal sapogenins, the latter being well known starting materials for useful male and female sex hormones and adrenocortical hormones. The steroidal saponins are glycosides in which a variable number of hexoses or pentoses, or mixtures of these sugars, are attached to the steroid nucleus or aglycone part of the molecule. Most steroidal saponins are water soluble and in this form can be extracted from plants with water or by macerating sapogenaceous plants and then expressing the juices.

The saponins may then be precipitated from their aqueous solutions by a process of partial hydrolysis which removes most but not all of the sugars attached to the steroidal sapogenin. The partial hydrolysis may be carried out as in United States Patent No. 2,780,620. In general, according to the process of this patent, the freshly ground plant is extracted with water and the extract is acidified to a pH of about 1 to 2, with a strong mineral acid, for example, partially to hydrolyze the saponin present in the extract. The partially hydrolyzed saponins are insoluble and precipitate and are separated in any conventional manner.

The partially hydrolyzed water insoluble saponins thus obtained are converted to sapogenins by treatment with stronger acids, and the crude sapogenin thus obtained further purified by extraction with appropriate solvents.

The partially hydrolyzed steroidal saponins obtained by the process of Patent No. 2,780,620 are very impure. Often (cf. Examples 1, 2, and 3) the active ingredient will amount to less than 10% of the crude mixture of total solids. As a result a large volume of stronger acid is required to suspend and hydrolyze the crude partially hydrolyzed saponin to sapogenin. Furthermore, the treatment with strong acid does not result in substantial purification and the crude steroidal sapogenin product often contains 80–90% inert solids. Consequently large volumes of organic solvents are required to extract the crude sapogenin away from the inert solid material.

We have discovered a process which permits substantial purification of partially hydrolyzed saponins thus affording very significant economies in the quantities of strong acid and organic solvents required to convert the partially hydrolyzed saponins to steroidal sapogenins. Moreover the steroidal sapogenins thus obtained are more easily purified because extraneous and inert components are removed prior to final purification.

According to our invention the crude mixture containing the partially hydrolyzed water insoluble steroidal saponins is extracted with hot aqueous alcohol solution, the solution containing preferably about 50 to 95% alcohol, the alcohol being a short chain aliphatic alcohol such as methanol, ethanol, n-propanol or isopropanol, the alcoholic extract is clarified, as by filtration or suitable means, concentrated, thereby preferentially removing alcohol, until the partially hydrolyzed saponin begins to precipitate, cooled as to room temperature or below, and filtered to recover the precipitated purified partially hydrolyzed saponin.

There are two salient features to our invention. On extraction with aqueous alcohol the partially hydrolyzed saponin dissolves completely but some of the accompanying impurities are insoluble and may be removed by filtration. Even more important is the fact that when the alcoholic solution is concentrated to a point where the composition of the alcohol ranges between 10% and 50% depending upon the type of sapogenin present in the plant extract the partially hydrolyzed saponin precipitates, whereas most of the impurities remain soluble in the dilute aqueous alcohol. The purified saponin is then collected by filtration and can then be hydrolyzed to sapogenin in the usual manner. The exact optimum quantity of alcohol-water to obtain maximum purification varies with the plant species. In general the aqueous alcoholic extract is concentrated about five-fold or to the point where precipitation of the partially hydrolyzed saponin is noted.

As a result of purification in this manner the quantity of acid required for final hydrolysis can be reduced 600%. Similar savings occur in quantities of organic solvents used to extract the crude sapogenin and in quantities of adsorbents required for purification. The invention is applicable to partially hydrolyzed saponins of all sapogenoceous plants including Agave, Yucca, and Dioscorea species.

The following examples exemplify the invention in greater detail.

Example 1

A crude partially hydrolyzed saponin product was prepared from *Agave sisalana* juice by the acid procedure described in United States Patent No. 2,780,620. In a control experiment 47.0 g. of the above dry preparation was further hydrolyzed with 400 ml. of 3 N sulfuric acid and the resultant crude sapogenin thus obtained extracted with 1 liter of hexane, the hexane solution purified by adsorption on 5.0 g. of carbon, and evaporated to dryness. Yield, 2.74 g. purified sapogenin. The percent of sapogenin in the original partially hydrolyzed saponin was $$\frac{2.74}{47.0} \times 100 = 5.8\%$$

Another 47.0 g. of the same preparation used in the control was extracted with 2 liters of hot 85% ethanol and filtered. The insoluble residue weighed 25 grams and was discarded. The alcoholic solution was concentrated from 2 liters to 0.2 liter, cooled to room temperature and filtered. The precipitate of purified, partially hydrolyzed saponin weighed 14.0 g. On hydrolysis with 70 ml. of 3 N sulfuric acid and extraction of the crude sapogenin with 200 ml. of hexane plus 1.0 gram of carbon, 2.89 gram of purified sapogenin was obtained. The sapogenin content of the partially hydrolyzed saponin was $$\frac{2.89}{14.0} \times 100 = 20.6\%$$

a four-fold increase in purity over the control.

Example 2

The same weight of crude, partially hydrolyzed saponin as described in Example 1 was extracted with a solution of 90% methanol-10% water, v./v. Concentration as in Example 1 gave 13.0 grams of purified saponin which yielded 2.6 g. of sapogenin.

Example 3

The same weight of saponin as described in Example 1 was extracted with a solution of 60% propanol-40% water, v./v., to give the following concentration, 13.5 grams of purified saponin, which gave 2.7 grams of pure sapogenin.

Example 4

The same weight of saponin as described in Example 1 was extracted with a solution of 50% isopropanol-50% water, v./v., to give, following concentration, 14.0 grams of purified product which on acid hydrolysis gave 2.83 grams of pure sapogenin.

Example 5

A partially hydrolyzed saponin was prepared from the leaves of *Agave lecheguilla* by the method of U.S. Patent 2,780,620. In a control experiment 32.15 grams of dry partially hydrolyzed saponin hydrolyzed with 125 ml. of 3 N sulfuric acid, yielding after extraction with hexane 3.85 grams of smilagenin. Sapogenin content $$\frac{3.85}{32.15} \times 100 = 12.0\%$$

In a parallel experiment 32.15 grams of the above saponin was extracted with 1 liter of 85% ethanol-15% water, v./v., leaving 4.6 grams insoluble matter which was removed by filtration. On concentration to 200 ml., a precipitate of 6.4 grams of purified saponin was obtained which yielded on further hydrolysis with 25 ml. of 3 N sulfuric acid 4.1 grams of smilagenin. The sapogenin content was $$\frac{4.1}{6.4} \times 100 = 64\%$$

a five-fold increase over the control.

Example 6

A partially hydrolyzed saponin was prepared from the seed pods and seeds of *Yucca brevifolia* by the method outlined in U.S. Patent 2,780,620.

In a control experiment 100.0 grams of partially hydrolyzed saponin gave 8.87 grams of purified sapogenin, consisting of a mixture of tigogenin and hecogenin. Hence the purity of the saponin was 8.87%.

In a parallel experiment 100.0 grams of the above saponin on extraction with 85% ethanol-15% water, v./v., followed by concentration gave 13.6 grams purified saponin which on further hydrolysis gave 8.50 grams sapogenin. The purity was $$\frac{8.50}{13.6} \times 100 = 62.5\%$$

a seven-fold increase over the control.

Example 7

In a similar manner the partially hydrolyzed saponin from tubers of *Dioscorea composita* gave in a control experiment a purity of 15.0% which by the 85% ethanol-15% water procedure as in Example 1 was increased to 63.0%. The sapogenin isolated in this case was diosgenin.

Example 8

In a control experiment the leaves of *Yucca schidigera* gave a partially hydrolyzed saponin with a purity of 9.8%. In a parallel experiment extraction of the crude saponin with 60% isopropyl alcohol-40% water followed by concentration gave a product of 55% purity, the sapogenin isolated being sarsasapogenin.

Example 9

In a similar manner the leaves of *Agave fourcroydes* (Hennequen) gave a partially hydrolyzed saponin of 11.3% purity, which on extraction with 70% methanol-30% water followed by concentration gave a purified saponin of 63.5% purity, the sapogenin being hecogenin.

Although the examples cited used dried crude partially hydrolyzed saponin preparations as a starting material for the process of this invention, thus facilitating calculations of yields, the process is equally applicable to wet crude partially hydrolyzed saponins, for example the wet filter cake or the centrifuged solids recovered from the previously mentioned partial hydrolysis processes.

We claim:

A process for purification of a partially hydrolyzed water insoluble steroidal saponin obtained from a plant in a genus selected from the group consisting of Agave, Yucca and Dioscorea by extracting the freshly ground plant with water and acidifying the extract to a pH of about 1 to 2 to precipitate a crude mixture containing the partially hydrolyzed saponins, comprising extracting the mixture with hot aqueous 50 to 95% monohydric aliphatic alcohol containing 1 to 3 carbon atoms, to obtain an alcoholic extract containing said saponin, clarifying said extract, concentrating said extract until the partially hydrolyzed saponin begins to precipitate, cooling the concentrated extract, and recovering the purified partially hydrolyzed saponin.

References Cited in the file of this patent

UNITED STATES PATENTS

| | | |
|---|---|---|
| 2,395,337 | Marker et al. | Feb. 19, 1946 |
| 2,791,581 | Wall et al. | May 7, 1957 |

OTHER REFERENCES

Wall et al.: J. Biol. Chem., October 1952, pp. 533–543.